Oct. 25, 1966     I. DEUTSCH     3,280,841
FLUID MIXING AND PROPORTION MAINTAINING APPARATUS
Filed March 6, 1964
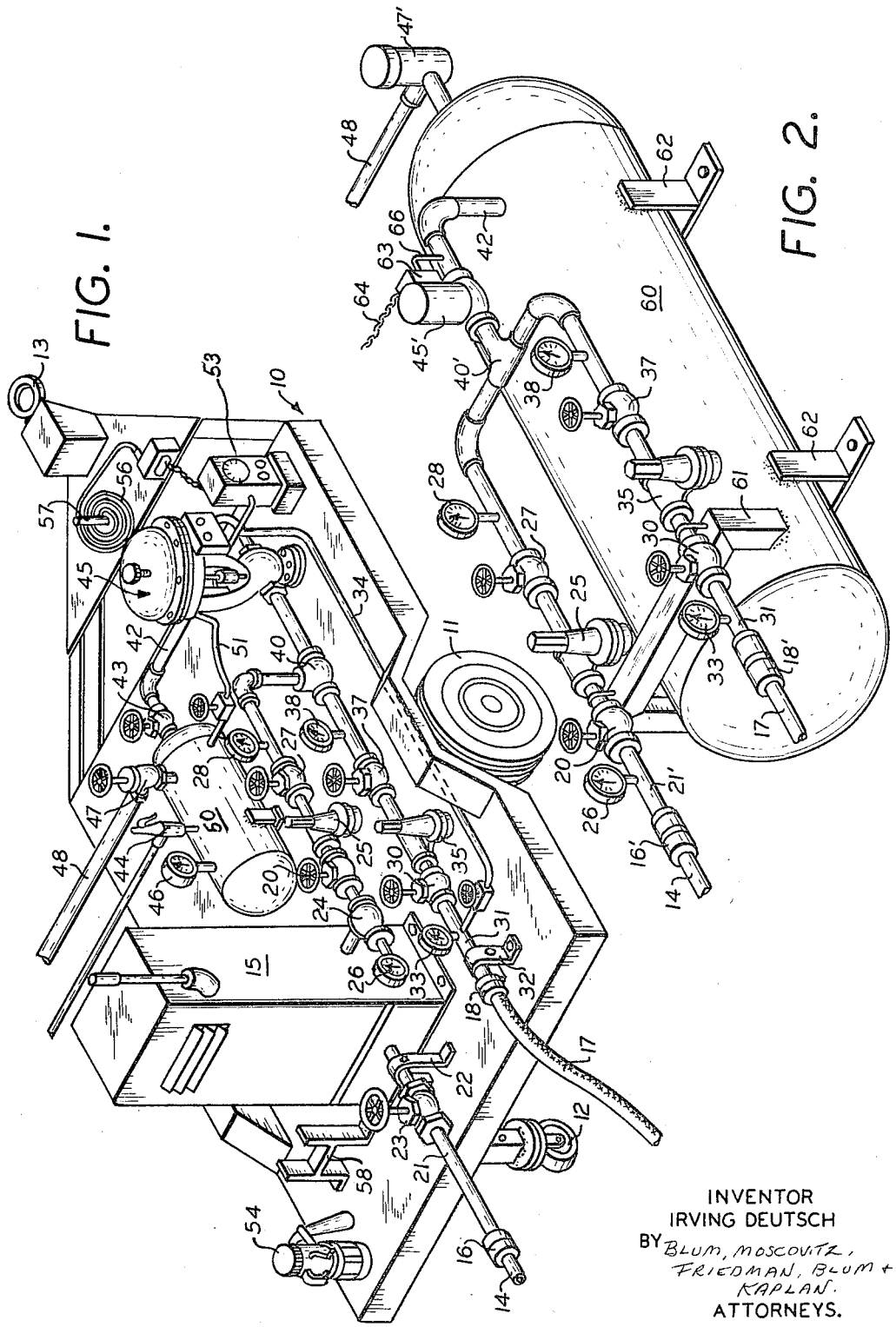
INVENTOR
IRVING DEUTSCH
BY Blum, Moscovitz,
Friedman, Blum &
Kaplan.
ATTORNEYS.

United States Patent Office 3,280,841
Patented Oct. 25, 1966

3,280,841
FLUID MIXING AND PROPORTION MAINTAINING APPARATUS
Irving Deutsch, East Meadow, N.Y., assignor to Gas Purifying Materials Company, Incorporated, Long Island City, N.Y., a corporation of New York
Filed Mar. 6, 1964, Ser. No. 349,957
7 Claims. (Cl. 137—606)

This invention relates to fluid mixing and proportioning apparatus and, more particularly, to a novel simplified, inexpensive and efficient fluid mixing apparatus for controlling the proportioning of two intermixed fluids.

An object of the invention is to provide a fluid mixing apparatus by means of which two or more fluids, in either the liquid or the gaseous state, may have their proportions in the mixture maintained constant irrespective of the rate of consumption and up to the rated capacity of the equipment.

A further object of the invention is to provide such fluid mixing apparatus in which economy is attained by using low cost and commercially available valves and regulators.

Still another object of the present invention is to provide fluid mixing apparatus in which the proportioning of two intermixed fluids is maintained constant even if the rate of consumption of the final mixture drops to zero.

An object subsidiary to the foregoing object is to effect such control of the proportioning by utilizing a snap action valve on the mixture output line, which operates in response to the desired pressure of the mixture and which may be powered either electrically or pneumatically.

A further object of the invention is to provide a fluid mixing apparatus including a simple safety shut-down feature in the event of loss of one or more of the fluid streams.

The immediately foregoing object is obtained by utilizing one of the fluid streams to provide the motive power for the snap action valve if the latter is pneumatically operated, and in such a manner that the snap action valve will "fail safe" in the closed position. If an electrically operated snap action valve is used in the apparatus, such "fail safe" operation can be obtained by using a pressure controlled electric switch so that loss of fluid pressure will cut power to the electrically operated valve causing the latter to "fail safe" in the closed position.

An ancillary feature of the invention is to provide fluid mixing apparatus of the type mentioned and which is simple and compact to an extent such that it may be readily incorporated in a portable fluid mixing plant characterized by ease of operation, maintenance, and starting procedures. Thus, the fluid mixing apparatus of the invention may be mounted on a trailer on which may be also mounted all the accessories necessary to connect the portable mixing plant to the sources of fluid and to the load in a safe and efficient manner and in compliance with existing safety codes.

Still a further object of the invention is to provide a fluid mixing apparatus as set forth above in which there is mounted on the trailer a vaporizer suitable for vaporization of high pressure liquid petroleum gas, and a mixing tank also serving as a surge tank and reservoir of mixed liquid petroleum gas and air so as to supply a suitable mixture of the latter that can be used interchangeably with natural gas or manufactured gas distributed by utilities or used by industrial establishments.

For an understanding of the principles of the invention, reference is made to the following description of typical embodiments thereof as illustrated in the accompanying drawings.

In the drawings:
FIG. 1 is an essentially isometric view of fluid mixing apparatus embodying the invention as mounted upon a trailer for portability; and
FIG. 2 is a similar view of the apparatus as mounted upon a final mixture containing tank serving as a base for the apparatus components.

Referring first to FIG. 1, the apparatus of the invention is therein illustrated as mounted upon a trailer 10 having main support wheels 11, an auxiliary support wheel 12, and a trailer hitch 13. In this embodiment of the invention, the first fluid is preferably a liquid fluid such as liquefied petroleum gas (LPG), for example propane or butane. This gas must be vaporized before mixing with the second fluid, and for this purpose a vaporizer 15 is mounted on trailer 10. In a mobile installation such as shown in FIG. 1, vaporizer 15 would generally be direct fired, and the fuel used for the direct firing of the vaporizer could be the first fluid. However, it should be understood that vaporizer 15 can be heated by steam or by hot water.

The first fluid, such as LPG, is delivered through a supply line 14 which is disengageably connected, by a coupling 16, to a first fluid inlet line 21. Inlet line 21 is supported on a bracket 22 on trailer 10, and delivers the first fluid to the inlet of vaporizer 15. A suitable manually operable control valve 23 is interposed in inlet line 21. The outlet of vaporizer 15 is connected to the stem of a T coupling 24 which has connected, to one of its branches, a pressure gauge 26 which indicates the outlet pressure of the first fluid vaporized by vaporizer 15 and also the pressure of the first fluid as it enters the proportioning system. A globe or needle valve 20 is connected to the other branch of T 24 and also to a first pressure regulator 25.

The second fluid, which may be air in the particular example of FIG. 1, is supplied through a supply line 17 which is disengageably connected by a coupling 18 to a second fluid inlet line 31 supported on a bracket 32 on trailer 10. A globe or needle valve 30 connects second fluid inlet line 31 to a second fluid pressure regulator 35. A pressure gauge 23 connected to inlet line 21 in advance of valve 30 indicates the pressure of the second fluid entering the system.

Regulators 25 and 35 are the type in which the pressure may be adjusted or set by varying the pressure on a spring loaded diaphragm. A suitable commercially available regulator, which may be used for the regulators 25 and 35, is a Fischer Regulator Company, Regulator No. 620. A needle or globe valve 27 is connected to the outlet of pressure regulator 25, and a similar needle or globe valve 37 is connected to the outlet of pressure regulator 35. These needle or globe valves may be used as variable orifices to obtain fine adjustments in the proportioning of the two fluids. The outlet of valve 27 is connected to the stem of a mixing T 40, and the outlet of valve 37 is connected to a branch of T 40. Pressure gauges 28 and 38, respectively, are provided to indicate the pressure of the first and second fluids, respectively, entering the mixing T 40.

The first and second fluids to be proportioned mix as a common fluid at the mixing T 40, and the outlet branch of this mixing T is connected by a line 41 to a snap action, or rapid open and closing, valve 45. From snap action valve 45, the mixed fluids are delivered through piping 42 and a control valve 43 to a tank 50. Tank 50 is provided with a safety valve 44, and the pressure within the tank is indicated by a gauge 46. The mixture is delivered from tank 50 to a consuming appliance through a control valve 47 connected to a mixture outlet or delivery pipe 48.

The pressure within tank 50 is applied to valve 45 through the medium of a line 51. The snap action valve 45 may be a Fischer Wizard snap action control valve with a pneumatic relay, or a pressure controlled solenoid valve may be used as described in connection with the embodiment of the invention shown in FIG. 2. Pressure air may be used to actuate the diaphragm of valve 45 to open the valve, and this pressure air may be applied through a line 34 connected at one end to valve 45 and at its opposite end to second fluid inlet line 31. In the case of an LPG-air system, the feed stock air is used because of its availability and because it provides safety shut-down if the air supply is lost. Indication and further control of the final mixture may be obtained by an indicator 53 connected to the tank 50. This indicator could indicate specific gravity, thermal conductivity, heating value, or any other physical characteristic of the final mixture that would reflect the proportions in the mixture. However, if more than two fluids are mixed, it possibly would be necessary to resort to component analysis by chromatography, for example, using a commercially available instrument such as an "Analograph."

In the case of LPG-air system, the air is supplied at at least the desired outlet pressure of the final mixture. Regulators 25 and 35 are adjusted so that the LPG regulator 25 will open just before the air pressure regulator 35. With the regulators 25 and 35 being forced to operate in a close down stream pressure range, there is a close proportioning control provided from no-load to design capacity load. Furthermore, these regulators 25 and 35 act as check valves to prevent backfeed of one feed stock into the other.

Snap action valve 45 is set to close at the highest desired operating pressure, and is set to open at a pressure close to the desired operating pressure but slightly lower.

Thus, if the load pressure at delivery piping 48 and in tank 50 is at or above the high setting of snap action valve 45, the latter will snap closed and regulators 25 and 35 will close due to the back pressure in the small volume downstream piping. When the load re-starts to draw the mixture from tank 50, the pressure therein will drop to the lower setting and, responsive to such dropping, valve 45 will open permitting proportioned feed stock to feed through regulators 25 and 35 until the pressure in tank 50 is once again built up to the desired higher value. Since regulators 25 and 35 operate in a narrow pressure range, the ratio of the feed stocks fed to tank 50 will remain essentially constant.

Due to the simplicity of the control system with its few parts and few interconnections, it is possible to construct a high capacity mixing plant on a relatively small trailer 10, which can be provided with all the necessary piping and safety equipment such as, for example, a fire extinguisher 54. For lighting and for instrument operation, electric power can be supplied by means of an extension cord 56 wound around a post 57. Racks, such as 58, may be provided to safely support the piping necessary to reach the feed stock supplies, such as tanks or compressors, and also to deliver the mixture to the load.

In the arrangement of FIG. 2, those components which are constructed the same and assembled the same as in FIG. 1 have been given the same reference characters, whereas those components which perform the same function as corresponding components in FIG. 1, but which differ somewhat in construction or in connection, have been given the same reference characters primed. In the embodiment of FIG. 2, the entire mixing and proportioning arrangement is mounted on a tank 60 by means of support brackets such as 61. In turn, tank 60 is supported by brackets 62 either upon a trailer or upon any other suitable support surface. The pneumatic snap action valve 45 is replaced by a solenoid operated valve 45' provided with a pressure actuated control switch 63 connected to a suitable source of operating potential by electric leads 64. The mixture outlet pressure is supplied to switch 63 through a lead or conduit 66.

The snap action valve principle as described may be used in connection with any mixing system upstream of the valve 45 or 45'. For example, the mixing system could be a jet ejector or a pilot regulator control system for adjusting the valves 25 and 35. The advantage gained by using this snap action valve 45 or 45' is that the system would then be capable of controlling to 100% shut-down. In the case of a jet ejector, used in connection with LPG-air mixing system, for example, the liquefied petroleum gas acts as the power fluid for entraining the air through a check valve on the air inlet to the ejector. The operation is such that when the pressure builds up in the tank 50 or 60 to approximately 5 p.s.i.g., the liquefied petroleum gas is shut off at the inlet to the jet interior of the ejector. When the tank pressure drops to approximately 1 or 2 p.s.i.g., or lower as desired, the flow of liquid petroleum gas is resumed to cause air to be entrained through a jet valve that opens due to suction created by the liquid petroleum gas flowing through the venturi. In a well designed ejector, a one-to-one mixture of liquid petroleum gas and air is possible.

While specific embodiments of the invention have been shown and described in detail to illustrate the application of the principles of the invention, it will be understood that the invention may be embodied otherwise without departing from such principles.

What is claimed is:

1. Fluid mixing apparatus, for controlling the proportioning of two intermixed fluids, comprising, in combination, a first fluid inlet line for a first fluid; a first pressure regulator in said first fluid inlet line; a second fluid inlet line for a second fluid; a second pressure regulator in said second fluid inlet line; both pressure regulators closing responsive to downstream pressure in excess of the pressure regulator setting, and said first pressure regulator being adjusted to open slightly in advance of said second pressure regulator; a header commonly communicating with both of said fluid inlet lines downstream of said pressure regulators; a pressure responsive snap action valve having its inlet connected to said header; a fluid mixture receiver connected to the outlet of said snap action valve; and means interconnecting said receiver and said snap action valve and effective to apply, to said snap action valve, the pressure within said receiver to snap said snap action valve closed when said pressure exceeds a first pre-set value thereby closing said first and second pressure regulators and to snap said snap action valve open when said pressure drops to a second predetermined value thereby closing said first and second pressure regulators.

2. Fluid mixing apparatus, as claimed in claim 1, including a pair of flow regulating orifice means each connected between a pressure regulator and said header and effective to provide a fine control of the proportioning of said first and second fluids.

3. Fluid mixing apparatus, for controlling the proportioning of two intermixed fluids, comprising, in combination, a first fluid inlet line for a first fluid; a second fluid inlet line for a second fluid; pressure regulator means in said first and second fluid inlet lines; mixing means, having an inlet and an outlet and fluid proportioning means, commonly communicating hydraulically with the downstream ends of said inlet lines; a fluid mixture receiver connected to the outlet of said mixing means; and valve means responsive to the pressure of fluid in said receiver exceeding a predetermined value to interrupt the flow of fluid through said mixing means, the back pressure thereby created in said first and second inlet lines causing said pressure regulator means to interrupt the fluid flow in said first and second fluid inlet lines.

4. Apparatus as defined in claim 3 wherein said valve means comprises a pneumatic snap action valve.

5. Apparatus as defined in claim 3 including a source of elecrical potential and wherein said valve means comprises a snap action valve, a solenoid operative to open and close said valve, a pressure actuated control switch interconnecting said solenoid and said electrical potential source, said control switch being operative to render said snap action valve open and closed in accordance with the fluid pressure in said receiver being within predetermined limits.

6. Fluid mixing apparatus, as claimed in claim 5, in which said fluid mixture receiver is a tank; said apparatus being mounted on said tank.

7. Fluid mixing apparatus, for controlling the proportioning of two intermixed fluids, comprising, in combination, a first fluid inlet line for a first fluid; a second fluid inlet line for a second fluid; fluid mixing means, including means for proportioning said first and second fluids, connected to the downstream ends of said inlet lines; a pressure responsive snap action valve connected to said mixing means; a fluid mixture consumer connected to the outlet of said snap action valve; and means operable to apply the pressure of said fluid mixture consumer to said snap action valve to close said snap action valve, responsive to the pressure in said fluid mixture consumer attaining a first predetermined value and to open said snap action valve responsive to the pressure in said fluid mixture consumer decreasing to a second predetermined value thereby maintaining the pressure in said fluid mixture consumer within said first and second predetermined values.

References Cited by the Examiner

UNITED STATES PATENTS

| | | | |
|---|---|---|---|
| 1,452,265 | 4/1923 | Collins et al. | 137—606 X |
| 1,765,549 | 6/1930 | Thurm | 137—98 X |
| 2,341,177 | 2/1944 | Cope | 137—98 |
| 2,638,224 | 5/1953 | Rupp | 137—344 |
| 2,678,877 | 5/1954 | Ransome | 137—7 X |
| 2,702,561 | 2/1955 | Geffroy | 137—98 |
| 2,719,754 | 10/1955 | Weller | 137—344 X |
| 2,731,171 | 1/1956 | Mankin et al. | |
| 2,928,645 | 3/1960 | Loveland | 251—75 X |
| 2,973,776 | 3/1961 | Allen | 251—75 X |
| 3,088,325 | 5/1963 | Lawrence | 251—75 X |
| 3,160,171 | 12/1964 | Klein | 137—344 |

M. CARY NELSON, *Primary Examiner.*

S. SCOTT, *Assistant Examiner.*